US010650950B2

(12) United States Patent
Aoki et al.

(10) Patent No.: US 10,650,950 B2
(45) Date of Patent: May 12, 2020

(54) LAMINATED ELECTRONIC COMPONENT

(71) Applicant: TDK CORPORATION, Tokyo (JP)

(72) Inventors: Shunji Aoki, Tokyo (JP); Yuya Ishima, Tokyo (JP); Hajime Kato, Tokyo (JP); Yuto Shiga, Tokyo (JP); Kazuya Tobita, Tokyo (JP); Youichi Kazuta, Tokyo (JP); Satoru Okamoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/988,101

(22) Filed: May 24, 2018

(65) Prior Publication Data

US 2018/0342341 A1 Nov. 29, 2018

(30) Foreign Application Priority Data

May 29, 2017 (JP) .................. 2017-105359

(51) Int. Cl.
| | |
|---|---|
| *H01F 17/00* | (2006.01) |
| *H01G 4/12* | (2006.01) |
| *H01F 27/29* | (2006.01) |
| *H01G 4/30* | (2006.01) |
| *H01G 4/012* | (2006.01) |
| *H01G 4/005* | (2006.01) |

(52) U.S. Cl.
CPC ....... *H01F 17/0013* (2013.01); *H01F 27/292* (2013.01); *H01G 4/012* (2013.01); *H01G 4/12* (2013.01); *H01G 4/30* (2013.01); *H01G 4/005* (2013.01)

(58) Field of Classification Search
CPC .... H01F 17/0013; H01F 27/292; H01F 27/29; H01F 27/2804; H01G 4/12; H01G 4/30; H01G 4/005; H01G 4/0012
See application file for complete search history.

(56) References Cited

U.S. PATENT DOCUMENTS

| | | | | |
|---|---|---|---|---|
| 2008/0257488 | A1* | 10/2008 | Yamano | .............. H01F 17/0013 |
| | | | | 156/272.4 |
| 2012/0227250 | A1 | 9/2012 | Yamano | |
| 2015/0170834 | A1 | 6/2015 | Yamano | |
| 2016/0141102 | A1* | 5/2016 | Tseng | ..................... H01F 41/042 |
| | | | | 336/192 |
| 2017/0004918 | A1* | 1/2017 | Kido | .................... H01F 27/2804 |
| 2018/0068780 | A1* | 3/2018 | Shimoda | ............. H01F 27/2804 |

FOREIGN PATENT DOCUMENTS

| | | |
|---|---|---|
| CN | 105609267 A | 5/2016 |
| JP | 4816971 B2 | 11/2011 |

\* cited by examiner

*Primary Examiner* — Steven T Sawyer
*Assistant Examiner* — Paresh H Paghadal
(74) *Attorney, Agent, or Firm* — Oliff PLC

(57) ABSTRACT

A laminated electronic component includes an element body and a pair of conductors. The element body is formed by laminating a plurality of element-body layers in a first direction. The pair of conductors is formed by laminating a plurality of conductor layers in the first direction. The pair of conductors is provided to the element body in such a way as to be separated from each other in a second direction orthogonal to the first direction. At a cross section orthogonal to the first direction, the pair of conductors has an uneven portion and the element body has an uneven portion engaged with the uneven portion of the pair of conductors.

5 Claims, 9 Drawing Sheets

LAMINATED ELECTRONIC COMPONENT

TECHNICAL FIELD

One aspect of the present invention relates to a laminated electronic component.

BACKGROUND

Japanese Patent No. 4816971 discloses a laminated electronic component including an element body and a pair of conductors. The element body is formed by laminating a plurality of element-body layers in a first direction. The pair of conductors is provided to the element body in such a way as to be separated from each other in a second direction orthogonal to the first direction. In this laminated electronic component, uneven portions are formed at the boundary face between each conductor and the element body, and each conductor is engaged with the element body. For this reason, it is possible to suppress separation of the conductors from the element body.

SUMMARY

One aspect of the present invention is to provide a laminated electronic component in which separation of a conductor is further suppressed.

As a result of investigation and research, the inventors have found out the following. In a laminated electronic component, separation of a conductor easily occurs due to stress in a direction orthogonal to a first direction. In the laminated electronic component disclosed in Japanese Patent No. 4816971, the conductors have uneven portions at a cross section along the first direction. Thus, it is possible to suppress separation of the conductors due to stress in the first direction. However, it is difficult to suppress separation of the conductors due to stress in a direction orthogonal to the first direction.

A laminated electronic component according to one aspect of the present invention includes an element body and a pair of conductors. The element body is formed by laminating a plurality of element-body layers in a first direction. The pair of conductors is formed by laminating a plurality of conductor layers in the first direction. The pair of conductors is provided to the element body in such a way as to be separated from each other in a second direction orthogonal to the first direction. At a cross section orthogonal to the first direction, the pair of conductors has an uneven portion and the element body has an uneven portion engaged with the uneven portion of the pair of conductors.

In this laminated electronic component, at the cross section orthogonal to the lamination direction, each conductor has an uneven portion and the element body has an uneven portion engaged with the uneven portion of each conductor. For this reason, it is possible to suppress separation of the conductors due to stress orthogonal to the first direction.

Among the plurality of conductor layers, the number of conductor layers having uneven portions at the cross section orthogonal to the first direction may be equivalent to the total number of the plurality of conductor layers. In this case, all the conductor layers have the uneven portions at the cross section orthogonal to the first direction. Thus, as compared with a case in which some of the conductor layers have the uneven portions at the cross section orthogonal to the first direction, it is possible to further suppress separation of the conductors.

Among the plurality of conductor layers, the total number of conductor layers having uneven portions at the cross section orthogonal to the first direction may be fewer than the total number of the plurality of conductor layers. In this case, some of the conductor layers have the uneven portions at the cross section orthogonal to the first direction. Thus, it is possible to form steps between some of the conductor layers having the uneven portions and the other conductor layers at the cross section orthogonal to the first direction. As a result, it is possible to improve the adhesion between the conductors and the element body.

At a cross section along the first direction, the pair of conductors may have an uneven portion and the element body may have an uneven portion engaged with the uneven portion of the pair of conductors. In this case, it is possible to suppress separation of the conductors due to stress in the first direction.

At a cross section along the first direction, the pair of conductors may have an uneven portion and the element body may have an uneven portion engaged with the uneven portion of the pair of conductors. In this case, when the laminated electronic component is mounted on an electronic device by solder joint, by providing a first conductor portion on a mounting face of the element body and a second conductor portion on the outer face of the element body continuing to the mounting face, solder is provided not only on the mounting face but also on the outer face of the element body continuing to the mounting face. Thus, it is possible to increase mounting strength.

The length of the first conductor portion in the second direction and the length of the second conductor portion in a third direction may vary according to location in the first direction. In this case, for example, the end portion of the first conductor portion in the second direction and the end portion of the second conductor portion in the third direction can each have the uneven portion. Thus, it is also possible to suppress separation of the conductors due to stress in the first direction.

DETAILED DESCRIPTION

Hereinafter, an embodiment will be described in detail with reference to the accompanying drawings. In the following description, the same reference sign is assigned to the same element or the element having the same function, and the redundant description will be omitted.

Figure 1:
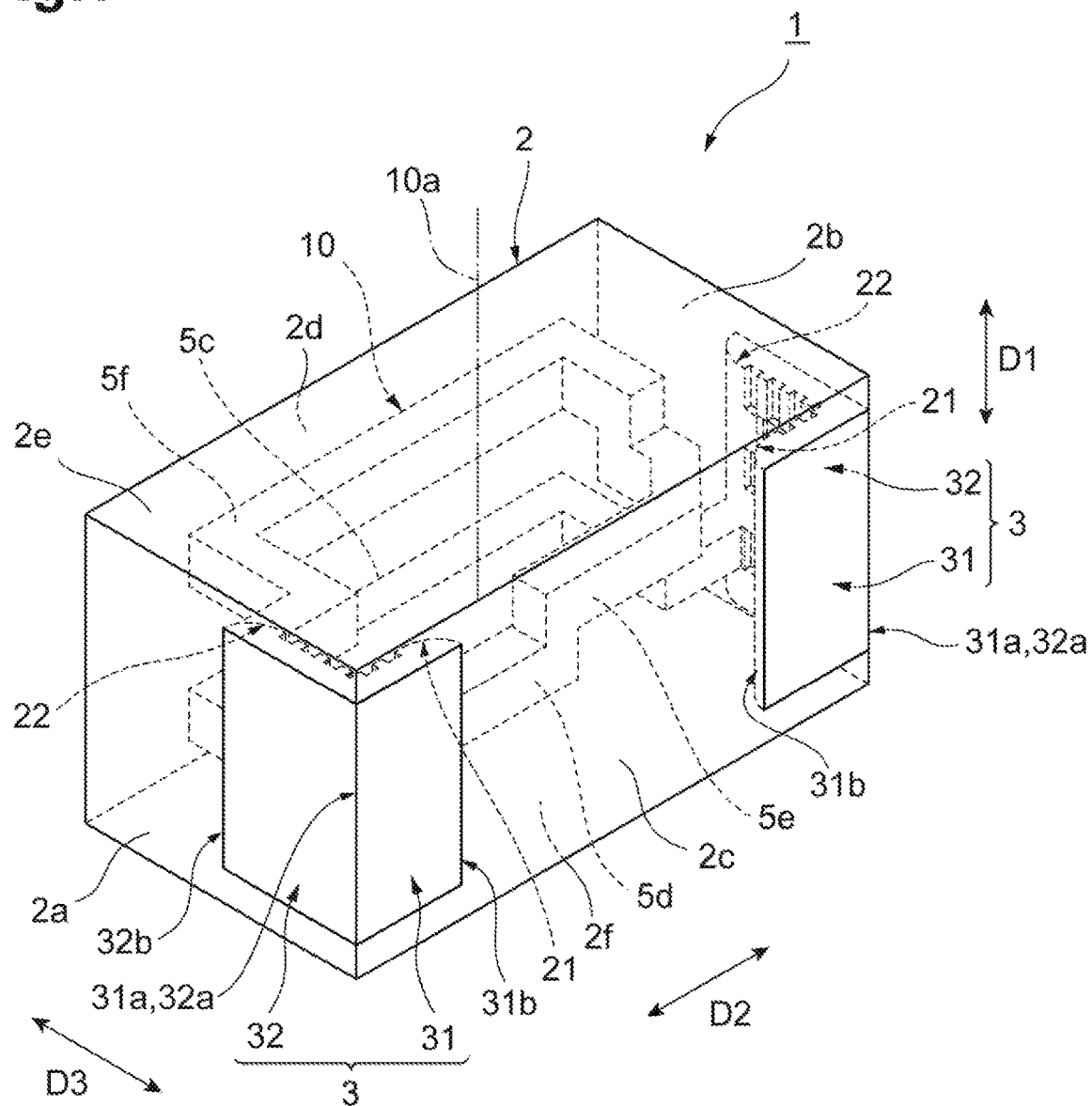
FIG. 1 is a perspective view of a laminated coil component according to an embodiment.
Figure 2:
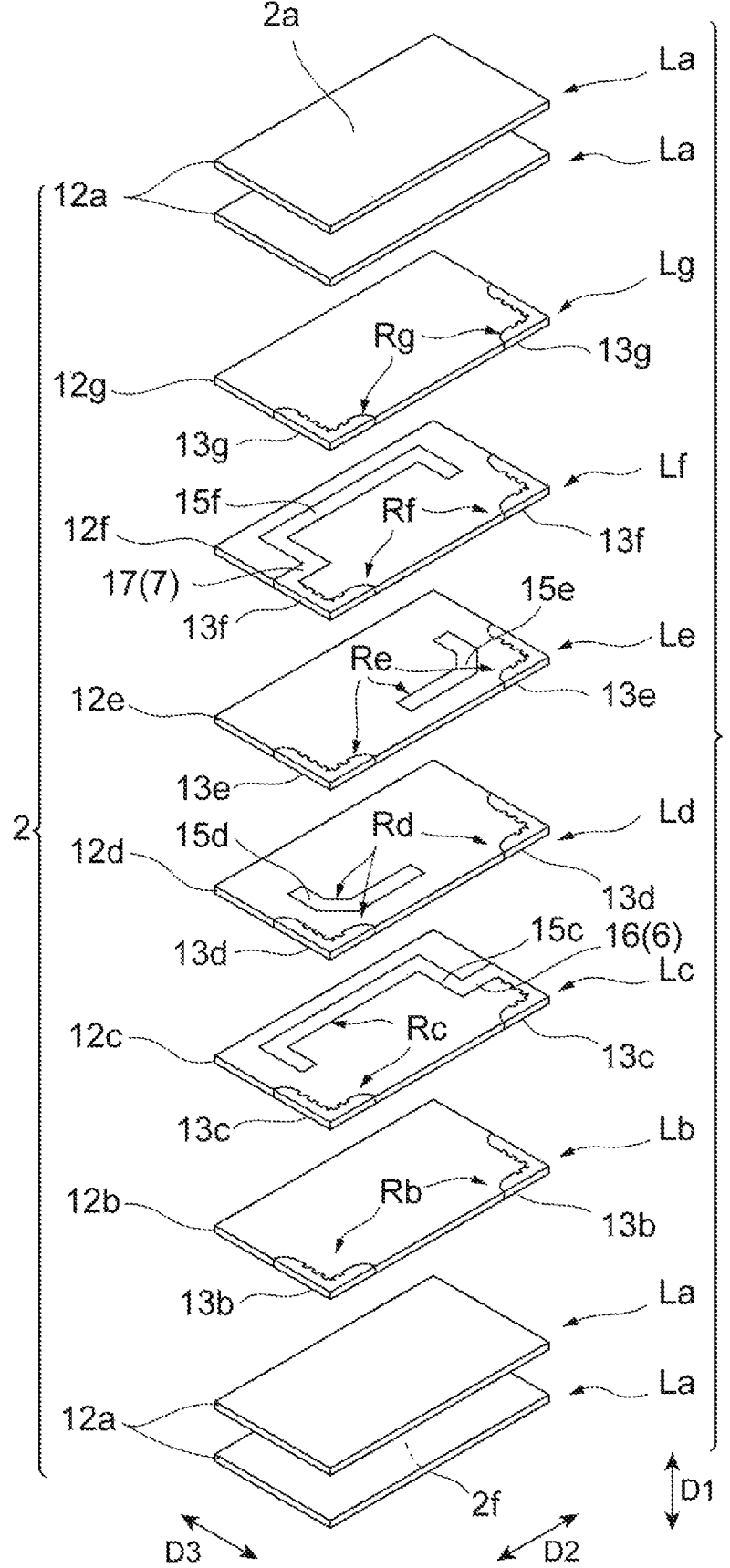
FIG. 2 is an exploded perspective view of the laminated coil component in FIG. 1.
Figure 3A:
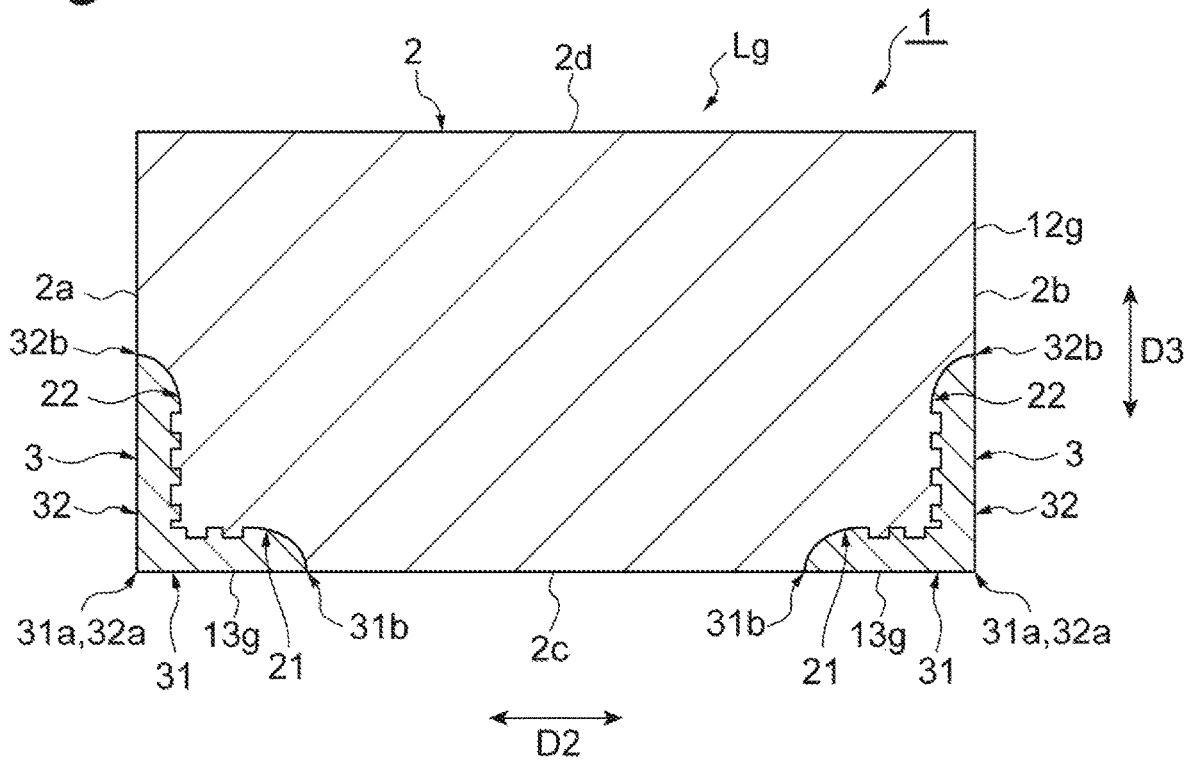
FIGS. 3A and 3B are cross-sectional views showing cross sections of the laminated coil component in FIG. 1 orthogonal to the lamination direction.
Figure 3B:
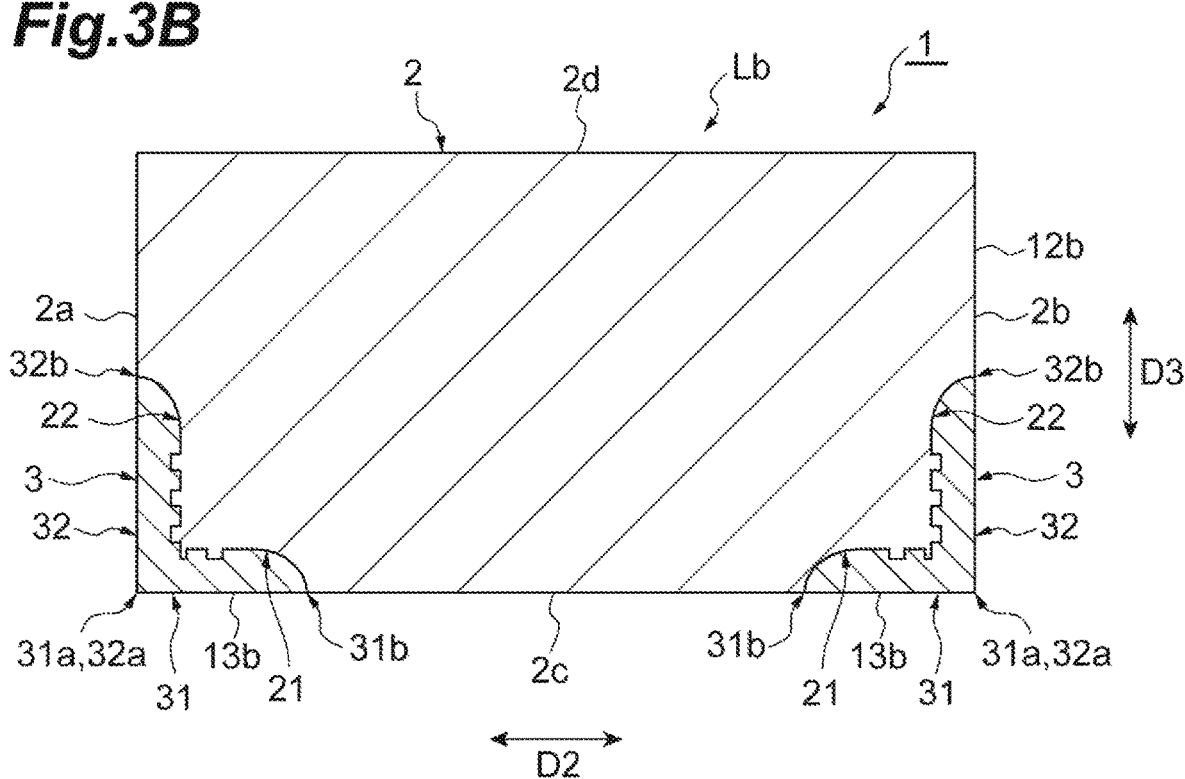

With reference to FIGS. 1, 2, 3A, and 3B, a laminated coil component according to an embodiment is described. FIG. 1 is a perspective view of the laminated coil component according to the embodiment. FIG. 2 is an exploded perspective view of the laminated coil component in FIG. 1. FIG. 3A is a cross-sectional view taken along line IIIa-IIIa of FIG. 1 FIG. 3B is a cross-sectional view taken along line IIIb-IIIb of FIG. 1. With reference to FIGS. 1 and 2, a laminated coil component 1 according to the embodiment includes an element body 2, a pair of conductors 3, a plurality of coil conductors 5c, 5d, 5e, and 5f, and connecting conductors 6 and 7.

The element body 2 has a rectangular parallelepiped shape. The rectangular parallelepiped shape includes a rectangular parallelepiped shape in which the corner portions and the ridge portions are chamfered, and a rectangular parallelepiped shape in which the corner portions and the ridge portions are rounded. The element body 2 has end faces 2a and 2b, and side faces 2c, 2d, 2e, and 2f serving as the outer face of the element body 2. The end faces 2a and 2b are opposed to each other. The side faces 2c and 2d are opposed to each other. The side faces 2e and 2f are opposed to each other. In the following description, it is assumed that the opposing direction of the side faces 2e and 2f is a direction D1, that the opposing direction of the end faces 2a and 2b is a direction D2, and that the opposing direction of the side faces 2c and 2d is a direction D3. The direction D1, the direction D2, and the direction D3 are substantially orthogonal to each other.

The end faces 2a and 2b extend in the direction D3 in such a way as to connect the side faces 2c and 2d. The end faces 2a and 2b also extend in the direction D1 in such a way as to connect the side faces 2e and 2f. The side faces 2c and 2d extend in the direction D2 in such a way as to connect the end faces 2a and 2b. The side faces 2c and 2d also extend in the direction D1 in such a way as to connect the side faces 2e and 2f. The side faces 2e and 2f extend in the direction D3 in such a way as to connect the side faces 2c and 2d. The side faces 2e and 2f also extend in the direction D2 in such a way as to connect the end faces 2a and 2b.

The side face 2c is a mounting surface and is opposed to another electronic device, which is not shown, (for example, a circuit substrate or an laminated electronic component) when, for example, the laminated coil component 1 is mounted on the electronic device. The end faces 2a and 2b are faces continuing from the mounting surface (that is, the side face 2c).

The length of the element body 2 in the direction D2 is longer than the length of the element body 2 in the direction D3 and the length of the element body 2 in the direction D1. The length of the element body 2 in the direction D3 and the length of the element body 2 in the direction D1 are equivalent to each other. That is, in the present embodiment, the end faces 2a and 2b each have a square shape, and the side faces 2c, 2d, 2e, and 2f each have a rectangular shape. The length of the element body 2 in the direction D2 may be equivalent to the length of the element body 2 in the direction D3 and to the length of the element body 2 in the direction D1, or may be shorter than these lengths. The length of the element body 2 in the direction D3 and the length of the element body 2 in the direction D1 may be different from each other.

In the present embodiment, the term "equivalent" may include, in addition to being equal, a value including a slight difference or a manufacturing error in a preset range. For example, if a plurality of values is included within the range of ±5% of the average value of the values, the values are defined to be equivalent.

The outer face of element body 2 is provided with a pair of depressions 21 and a pair of depressions 22. One depression 21 is provided on the end face 2a side of the side face 2c and is depressed toward the side face 2d. The other depression 21 is provided on the end face 2b side of the side face 2c and is depressed toward the side face 2d. One depression 22 is provided on the end face 2c side of the side face 2a and is depressed toward the side face 2b. The other depression 22 is provided on the end face 2c side of the side face 2b and is depressed toward the side face 2a.

The other depression 21 and the other depression 22 are continuously provided and correspond to one conductor 3. The other depression 21 and the other depression 22 are continuously provided and correspond to the other conductor 3. The depressions 21 and 22 have, for example, the same shape. In the present embodiment, the depression 21 and the depression 22 have different shapes from each other in that the width (the length in the direction D2) of the depression 21 is shorter than the width (the length in the direction D3) of the depression 22. The pair of depressions 21 and the pair of depressions 22 are provided apart from the side faces 2d, 2e, and 2f. The pair of depressions 21 is provided apart from each other in the direction D2.

The element body 2 is formed by laminating a plurality of element-body layers 12a to 12g in the direction D1. In other words, the lamination direction of the element body 2 is the direction D1. A specific laminated structure will be described later. In the actual element body 2, the element-body layers 12a to 12g are integrated in such a way that no boundaries between the layers can be visually recognized. The element-body layers 12a to 12g are formed of, for example, a magnetic material (Ni—Cu—Zn-based ferrite material, Ni—Cu—Zn—Mg-based ferrite material, Ni—Cu-based ferrite material, or the like). The magnetic material forming the element-body layers 12a to 12g may contain Fe alloy or the like. The element-body layers 12a to 12g may be formed of a non-magnetic material (a glass ceramic material, a dielectric material, or the like).

Each conductor 3 is provided on the element body 2. Specifically, each conductor 3 is disposed in the depressions 21 and 22. More specifically, the one conductor 3 is disposed in the one depression 21 and the one depression 22, and the other conductor 3 is disposed in the other depression 21 and the other depression 22. The pair of conductors 3 has, for example, the same shape. In the present embodiment, a conductor portion 31 and a conductor portion 32 have different shapes from each other in that the width (the length in the direction D2) of the conductor portion 31 is shorter than the width (the length in the direction D3) of the conductor portion 32. The pair of conductors 3 is provided on the element body 2 in such a way as to be separated from each other in the direction D2. Each conductor 3 is formed by laminating a plurality of conductor layers 13b, 13c, 13d, 13e, 13f, and 13g in the direction D1. That is, the lamination direction of the conductor layers 13b to 13g is the direction D1. In the actual conductor 3, the conductor layers 13b to 13g are integrated in such a way that no boundaries between the layers can be visually recognized.

Each conductor 3 has an L shape when viewed from the direction D1 (see FIG. 1). Each conductor 3 has a conductor portion 31 and a conductor portion 32 which are integrally provided. The conductor portion 31 extends in the direction D2. The conductor portion 32 extends in the direction D3. The conductor portion 31 is disposed in the depression 21.

The conductor portion 32 is disposed in the depression 22. The conductor portions 31 and 32 each have a substantially rectangular plate shape.

The conductor portion 31 includes an end portion 31a and an end portion 31b which are opposed to each other in the direction D2. The conductor portion 32 includes an end portion 32a and an end portion 32b which are opposed to each other in the direction D3. The end portion 31a and the end portion 32a are connected to each other and integrally provided. Corner portions disposed in the element body 2 at the end portion 31b and the end portion 32b have rounded shapes. In other words, the bottom faces of the depression 21 and the depression 22 are curved at the end portion 31b and the end portion 32b respectively. The corner portions disposed in the element body 2 at the end portion 31b and the end portion 32b may not be rounded, and the bottom faces of the depression 21 and the depression 22 may be flat.

Each conductor 3 may be provided with a plating layer (not shown) containing, for example, Ni, Sn, Au, or the like by electrolytic plating or electroless plating. The plating layer may include, for example, a Ni plating film containing Ni and covering the conductor 3, and an Au plating film containing Au and covering the Ni plating film.

The coil conductors 5c, 5d, 5e, and 5f shown in FIG. 1 are connected to each other to form a coil 10 in the element body 2. The coil axis of the coil 10 is provided along the direction D1. The coil conductors 5c, 5d, 5e, and 5f are disposed in such a way as to at least partially overlap each other when viewed from the direction D1. The coil conductors 5c, 5d, 5e, and 5f are disposed in such a way as to be separated from the end faces 2a and 2b and the side faces 2c, 2d, 2e, and 2f.

The coil conductor 5c includes a plurality of coil conductor layers 15c laminated in the direction D1. The coil conductor 5d includes a plurality of coil conductor layers 15d laminated in the direction D1. The coil conductor 5e includes a plurality of coil conductor layers 15e laminated in the direction D1. The coil conductor 5f includes a plurality of coil conductor layers 15f laminated in the direction D1. The plurality of the coil conductor layers 15c are disposed in such way as to entirely overlap each other when viewed from the direction D1. The plurality of the coil conductor layers 15d are disposed in such way as to entirely overlap each other when viewed from the direction D1. The plurality of the coil conductor layers 15e are disposed in such way as to entirely overlap each other when viewed from the direction D1. The plurality of the coil conductor layers 15f are disposed in such way as to entirely overlap each other when viewed from the direction D1. The coil conductor 5c may be constituted by a coil conductor layer 15c. The coil conductor 5d may be constituted by a coil conductor layer 15d. The coil conductor 5e may be constituted by a coil conductor layer 15e. The coil conductor 5f may be constituted by a coil conductor layer 15f. FIG. 2 shows one each of the plurality of the coil conductor layers 15c, the plurality of the coil conductor layers 15d, the plurality of the coil conductor layers 15e, and the plurality of the coil conductor layers 15f. In the actual coil conductor 5c, the plurality of the coil conductor layers 15c are integrated in such a way that no boundaries between the layers can be visually recognized. In the actual coil conductor 5d, the plurality of the coil conductor layers 15d are integrated in such a way that no boundaries between the layers can be visually recognized. In the actual coil conductor 5e, the plurality of the coil conductor layers 15e are integrated in such a way that no boundaries between the layers can be visually recognized. In the actual coil conductor 5f, the plurality of the coil conductor layers 15f are integrated in such a way that no boundaries between the layers can be visually recognized.

The connecting conductor 6 extends along the direction D2. The connecting conductor 6 is connected to the coil conductor 5c and the other conductor portion 32. The connecting conductor 7 extends along the direction D2. The connecting conductor 7 is connected to the coil conductor 5f and the one conductor portion 32. The connecting conductor 6 includes a plurality of connecting conductor layers 16 laminated in the direction D1. The connecting conductor 7 includes a plurality of connecting conductor layers 17 laminated in the direction D1. In FIG. 2, one of the plurality of the connecting conductor layers 16 and one of the plurality of the connecting conductor layers 17 are shown. In the actual connecting conductor 6, the plurality of the connecting conductor layers 16 are integrated in such a way that no boundaries between the layers can be visually recognized. In the actual connecting conductor 7, the plurality of the connecting conductor layers 17 are integrated in such a way that no boundaries between the layers can be visually recognized.

The conductor layers 13b, 13c, 13d, 13e, 13f and 13g, the coil conductor layers 15c, 15d, 15e, and 15f, and the connecting conductor layers 16 and 17 includes a conductive material (for example, Ag or Pd). Each layer may include the same material or different materials.

The laminated coil component 1 has layers La, Lb, Lc, Ld, Le, Lf and Lg. For example, the laminated coil component 1 is constituted by laminating, from the side face 2f side, two layers La, one layer Lb, three layers Lc, three layers Ld, three layers Le, three layers Lf, one layer Lg, and two layers La, in this order. FIG. 2 shows one of the three layers but not the other two layers for each of the three layers Lc, the three layers Ld, the three layers Le, and the three layers Lf.

The layer La is constituted by the element-body layer 12a.

The layer Lb is constituted by combining the element-body layer 12b and a pair of conductor layers 13b with each other. The element-body layer 12b is provided with a defect portion Rb. The defect portion Rb has shapes corresponding to the respective shapes of the pair of conductor layers 13b. The pair of conductor layers 13b is fitted into the defect portion Rb. The element-body layer 12b and the pair of conductor layers 13b have mutually complementary relationship as a whole.

The layer Lc is constituted by combining the element-body layer 12c, a pair of conductor layers 13c, the coil conductor layer 15c, and connecting conductor layer 16 with each other. The element-body layer 12c is provided with a defect portion Rc. The defect portion Rc has shapes corresponding to the respective shapes of the pair of conductor layers 13c, the coil conductor layer 15c, and the connecting conductor layer 16. The pair of the conductor layers 13c, the coil conductor layer 15c, and the connecting conductor layer 16 are fitted into the defect portion Rc. The element-body layer 12c, the pair of conductor layers 13c, the coil conductor layer 15c, and the connecting conductor layer 16 have mutually complementary relationship as a whole.

The layer Ld is constituted by combining the element-body layer 12d, a pair of conductor layers 13d, and the coil conductor layer 15d with each other. The element-body layer 12d is provided with a defect portion Rd. The defect portion Rd has shapes corresponding to the respective shapes of the pair of conductor layers 13d, and the coil conductor layer 15d. The pair of conductor layers 13d, and the coil conductor layer 15d are fitted into the defect portion Rd. The element-body layer 12*d*, the pair of conductor layers 13*d*, and the coil conductor layer 15*d* have mutually complementary relationship as a whole.

The layer Le is constituted by combining the element-body layer 12*e*, a pair of conductor layers 13*e*, and the coil conductor layer 15*e* with each other. The element-body layer 12*e* is provided with a defect portion Re. The defect portion Re has shapes corresponding to the respective shapes of the pair of conductor layers 13*e*, and the coil conductor layer 15*e*. The pair of conductor layers 13*e*, and the coil conductor layer 15*e* are fitted into the defect portion Re. The element-body layer 12*e*, the pair of conductor layers 13*e*, and the coil conductor layer 15*e* have mutually complementary relationship as a whole.

The layer Lf is constituted by combining the element-body layer 12*f*, a pair of conductor layers 13*f*, the coil conductor layer 15*f*, and the connecting conductor layer 17 with each other. The element-body layer 12*f* is provided with a defect portion Rf. The defect portion Rf has shapes corresponding to the respective shapes of the pair of conductor layers 13*f*, the coil conductor layer 15*f*, and the connecting conductor layer 17. The pair of the conductor layers 13*f*, the coil conductor layer 15*f*, and the connecting conductor layer 17 are fitted into the defect portion Rf. The element-body layer 12*f*, the pair of conductor layers 13*f*, the coil conductor layer 15*f*, and the connecting conductor layer 17 have mutually complementary relationship as a whole.

The layer Lg is constituted by combining the element-body layer 12*g* and a pair of conductor layers 13*g* with each other. The element-body layer 12*g* is provided with a defect portion Rg. The defect portion Rg has shapes corresponding to the respective shapes of the pair of conductor layers 13*g*. The pair of conductor layers 13*g* is fitted into the defect portion Rg. The element-body layer 12*g* and the pair of conductor layers 13*g* have mutually complementary relationship as a whole.

The defect portions Rb, Rc, Rd, Re, Rf and Rg are integrated to constitute the pair of depressions 21 and pair of depressions 22. The widths of the defect portions Rb, Rc, Rd, Re, Rf and Rg (hereinafter, the width of the defect portion) are basically set in such a way as to be wider than the those of the conductor layers 13*a*, 13*b*, 13*c*, 13*d*, 13*e*, 13*f*, and 13*g*, the coil conductor layers 15*c*, 15*d*, 15*e*, and 15*f*, and the connecting conductor layers 16 and 17 (hereinafter, the width of the conductor portion). The width of the defect portion may be intentionally set in such a way as to be narrower than the width of the conductor portion in order for the element-body layers 12*b*, 12*c*, 12*d*, 12*e*, 12*f* and 12*g* to adhere to the conductor layers 13*a*, 13*b*, 13*c*, 13*d*, 13*e*, 13*f*, and 13*g*, the coil conductor layers 15*c*, 15*d*, 15*e*, and 15*f*, and the connecting conductor layers 16 and 17 more firmly. The value obtained by subtracting the width of the conductor portion from the width of the defect portion is preferably, for example, −3 μm or more and 10 μm or less, and more preferably 0 μm or more and 10 μm or less.

FIGS. 3A and 3B are cross-sectional views showing cross sections of the laminated coil component in FIG. 1 orthogonal to the lamination direction. FIG. 3A shows a cross section of the layer Lg orthogonal to the direction D1. FIG. 3B shows a cross section of the layer Lb orthogonal to the direction D1. As shown in FIGS. 3A and 3B, at the cross section orthogonal to the direction D1, each conductor 3 has an uneven portion and the element body 2 (the bottom faces of the depressions 21 and 22) has an uneven portion engaged with the conductors 3. The state in which a pair of uneven portions is engaged with each other means a state in which the projections of one uneven portion and the projections of the other uneven portion are disposed alternately. Thus, for example, a gap may be partially formed between the uneven portion of the element body 2 and the uneven portion of the conductor 3.

The uneven portion of the element body 2 and the uneven portions of the conductor portions 31 and 32 have, for example, rectangular wave shapes. That is, the projections of the uneven portion of the element body 2 and the projections of the uneven portions of the conductor portions 31 and 32 have rectangular shapes. The conductor portions 31 and 32 each have an uneven portion engaged with the uneven portion of the element body 2. The uneven portions of the conductor portions 31 and 32 may be different from each other, or may have the same shape. The uneven portions of the conductor portions 31 and 32 are provided, for example, on portions other than the end portions 31*b* and 32*b* of the faces opposed to the bottom faces of the depressions 21 and 22.

In the uneven portion of the conductor portion 31, the direction in which the projections project and the depressions are depressed is the direction D3. In the uneven portion of the conductor portion 31, the projection height of the projections (the length of the projections in the direction D3) and the depression depth of the depressions (the length of the depressions in the direction D3) are preferably to be 20% to 80% of the thickness of the conductor portion 31 (the maximum length of the conductor portion 31 in the direction D3), and more preferably to be 20% to 60%. If those lengths are longer than 60%, the projections of the element body 2 can be exposed from each conductor 3 due to lamination displacement of the conductor layers 13*b* to 13*g*. If those lengths are longer than 80%, the projections of the element body 2 can be further exposed from each conductor 3 due to lamination displacement of the conductor layers 13*b* to 13*g*.

In the uneven portion of the conductor portion 32, the direction in which the projections project and the depressions are depressed is the direction D2. In the uneven portion of the conductor portion 32, the projection height of the projections (the length of the projections in the direction D2) and the depression depth of the depressions (the length of the depressions in the direction D2) are preferably to be 20% to 80% of the thickness of the conductor portion 32 (the maximum length of the conductor portion 32 in the direction D2), and more preferably to be 20% to 60%. If those lengths are longer than 60%, the projections of the element body 2 can be exposed from each conductor 3 due to lamination displacement of the conductor layers 13*b* to 13*g*. If those lengths are longer than 80%, the projections of the element body 2 can be further exposed from each conductor 3 due to lamination displacement of the conductor layers 13*b* to 13*g*. The thickness of the conductor portion 32 is equivalent to the thickness of the conductor portion 31.

All the conductor layers 13*b* to 13*g* constituting the conductors 3 (see FIG. 2) have uneven portions at the cross section orthogonal to the direction D1. That is, among the conductor layers 13*b* to 13*g*, the total number of conductor layers having uneven portions is equivalent to the total number of the conductor layers 13*b* to 13*g*. In the present embodiment, the conductor layers 13*b*, 13*d*, and 13*f* have the same shape. The conductor layers 13*c*, 13*e*, and 13*g* have the same shape.

Figure 4:
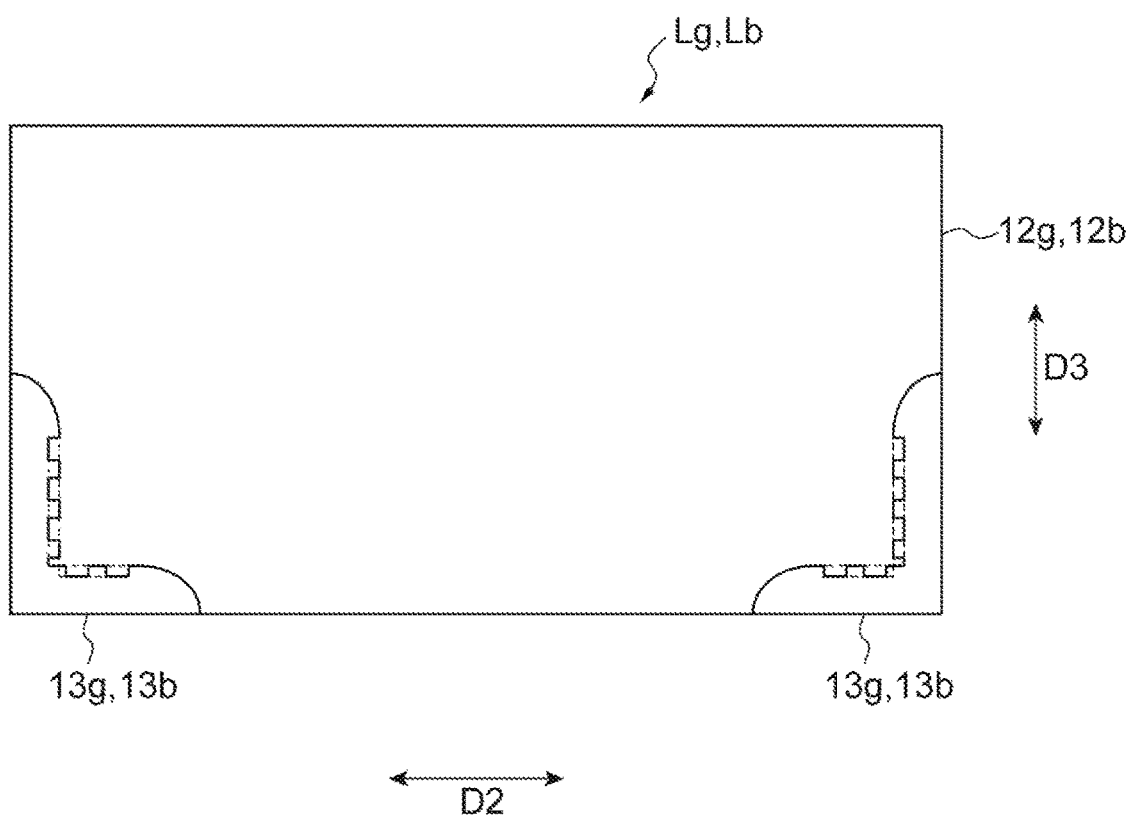
FIG. 4 is a view for explaining conductor layers.

FIG. 4 is a view for explaining the conductor layers. FIG. 4 shows that the conductor layer 13*b* and the conductor layer 13*g* overlap with each other in such a way that the conductor layer 13*g* is put on the conductor layer 13*b*. The conductor layer 13*b* is indicated by a broken line. As shown in FIG. 4, the uneven portion of the conductor layer 13*b* alternates with the uneven portion of the conductor layer 13g when viewed from the direction D1. In other words, when viewed from the direction D1, the projections of the uneven portion of the conductor layer 13b overlap with the depressions of the uneven portion of the conductor layer 13g, and the depressions of the uneven portion of the conductor layer 13b overlap with the projections of the uneven portion of the conductor layer 13g. When viewed from the direction D1, the projections of the uneven portion of the conductor layer 13b and the projections of the uneven portion of the conductor layer 13g are alternately disposed side by side.

As described above, the conductor layers 13b, 13d, and 13f have the same shape, and the conductor layers 13c, 13e, and 13g have the same shape. For this reason, at the cross section along the direction D1, each conductor 3 has the uneven portion and the element body 2 has the uneven portion engaged with the uneven portion of the conductor 3. Specifically, at the cross section along the direction D1 and orthogonal to the direction D2, the conductor portion 31 has the uneven portion and the element body 2 has the uneven portion engaged with the uneven portion of the conductor portion 31. At the cross section along the direction D1 and orthogonal to the direction D3, the conductor portion 32 has the uneven portion and the element body 2 has the uneven portion engaged with the uneven portion of the conductor portion 32. These uneven portions have, for example, rectangular wave shapes (corrugated shapes, grooved shapes, fluted shapes).

An example of a method for manufacturing the laminated coil component 1 according to the embodiment is described.

First, an element-body paste containing the constituent material of the element-body layers 12a to 12g and a photosensitive material is applied on a substrate (for example, a PET film). An element-body forming layer is thereby formed. The photosensitive material contained in the element-body paste may be either a negative type or a positive type, and a known photosensitive material can be used. Then, the element-body forming layer is exposed and developed by, for example, a photolithography method using a Cr mask. An element-body pattern from which a shape corresponding to the shape of a conductor forming layer to be described later is removed is thereby formed on the substrate. The element-body pattern is a layer to be each of the element-body layers 12b, 12c, 12d, 12e, 12f and 12g after heat treatment. That is, the element-body pattern provided with defect portions to be the defect portions Rb, Rc, Rd, Re, Rf and Rg is formed. Note that, the "photolithography method" in the present embodiment is only required to be a method for forming a desired pattern by exposing and developing a layer to be patterned containing a photosensitive material, and is not limited to the type of mask or the like.

On the other hand, a conductor paste containing the constituent materials of the above conductor layer 13b to 13g, the coil conductor layers 15c to 15f, and the connecting conductor layers 16 and 17, and a photosensitive material is applied on a substrate (for example, a PET film). A conductor forming layer is thereby formed. The photosensitive material contained in the conductor paste may be either a negative type or a positive type, and a known photosensitive material can be used. Then, the conductor forming layer is exposed and developed by, for example, a photolithography method using a Cr mask. A conductor pattern is thereby formed on the substrate. The conductor pattern is a layer to be each of the conductor layer 13b to 13g, the coil conductor layers 15c to 15f, and the connecting conductor layers 16 and 17 after the heat treatment.

Then, the element-body forming layer is transferred from the substrate onto a supporting body. In the present embodiment, the step of transferring the element-body forming layer is repeated twice. Two element-body forming layers are thereby laminated on the supporting body. These element-body forming layer are layers to be the layer La after the heat treatment.

Then, the conductor pattern and the element-body pattern are repeatedly transferred onto the supporting body. The conductor patterns and the element-body patterns are thereby laminated in the direction D3. Specifically, first, the conductor pattern is transferred from the substrate onto the element-body forming layer. Next, the element-body pattern is transferred from the substrate onto the element-body forming layer. The conductor pattern is combined with the defect portion of the element-body pattern, and the element-body pattern and the conductor pattern are in the same layer on the element-body forming layer. The step of transferring the conductor pattern and element-body pattern is further repeated. The conductor pattern and the element-body pattern are thereby laminated in a state of being combined with each other. The layers to be the layers Lb, Lc, Ld, Le, Lf and Lg after the heat treatment are thereby laminated.

Then, the element-body forming layer is transferred from the substrate onto the layers laminated in the steps of transferring the conductor pattern and the element-body pattern. In the present embodiment, the step of transferring the element-body forming layer is repeated twice. Two element-body forming layers are thereby laminated on the layer. These element-body forming layer are layers to be the layer La after the heat treatment.

As described above, a laminate constituting the laminated coil component 1 is formed on the supporting body after the heat treatment. Then, the obtained laminate is cut into a predetermined size. Thereafter, the cut laminate is subjected to debinding treatment, and then subjected to the heat treatment. The temperature of the heat treatment is, for example, about 850 to 900° C. The laminated coil component 1 is thereby obtained. As necessary, the conductor 3 may be provided with a plating layer by electrolytic plating or electroless plating after the heat treatment.

As described above, at the cross section orthogonal to the direction D1 in the laminated coil component 1, each conductor 3 has the uneven portion and the element body 2 has the uneven portion engaged with the uneven portion of each conductor 3. For this reason, it is possible to suppress separation of the conductors 3 due to stress orthogonal to the direction D1. Specifically, in the uneven portion of the conductor portion 31, the direction in which the projections project and the depressions are depressed is the direction D3. For this reason, according to the uneven portion of the conductor portion 31, it is possible to suppress separation of the conductor 3 due to stress in the direction D2. In the uneven portion of the conductor portion 32, the direction in which the projections project and the depressions are depressed is the direction D2. For this reason, according to the uneven portion of the conductor portion 32, it is possible to suppress separation of the conductor 3 due to stress in the direction D3.

Among the conductor layers 13b to 13g, the total number of conductor layers having uneven portions is equivalent to the total number of the conductor layers 13b to 13g. For this reason, all the conductor layers 13b to 13g have the uneven portions at the cross section orthogonal to the direction D1. Thus, as compared with a case in which some of the conductor layers have the uneven portions at the cross section orthogonal to the direction D1, it is possible to further suppress separation of the conductor 3.

At the cross section along the direction D1, each conductor 3 has the uneven portion and the element body 2 has the uneven portion engaged with the uneven portion of the conductor 3. For this reason, it is possible to suppress separation of the conductors 3 due to stress in the direction D1.

When viewed from the direction D1, the pair of conductors 3 has an L shape. The pair of conductors 3 has the conductor portions 31 provided on the side face 2c serving as the mounting face and the conductor portions 32 provided on the end faces 2a and 2b continuing from the side face 2c. For this reason, when the laminated coil component 1 is mounted on an electronic device by solder joint, solder is provided not only on the side face 2c but also on the end faces 2a and 2b continuing to the side face 2c. Thus, it is possible to increase mounting strength.

The width (the length in the direction D3) of the conductor portion 32 is longer than the width (the length in the direction D2) of the conductor portion 31. Accordingly, the length in the direction D3 of the portion, which is provided with the uneven portion, of the conductor portion 32 becomes longer than the length in the direction D2 of the portion, which is provided with the uneven portion, of the conductor portion 31. For this reason, as compared with the case in which the width of the conductor portion 32 is equivalent to the width of the conductor portion 31, it is possible to improve the adhesion between the conductors 3 and the element body 2. Each of the pair of conductor portions 31 is provided on the side face 2c. For this reason, from the viewpoint of preventing a short circuit, the width of the conductor portion 31 is restricted.

The present invention is not limited to the above embodiment, and various modifications can be made.

Figure 5A:
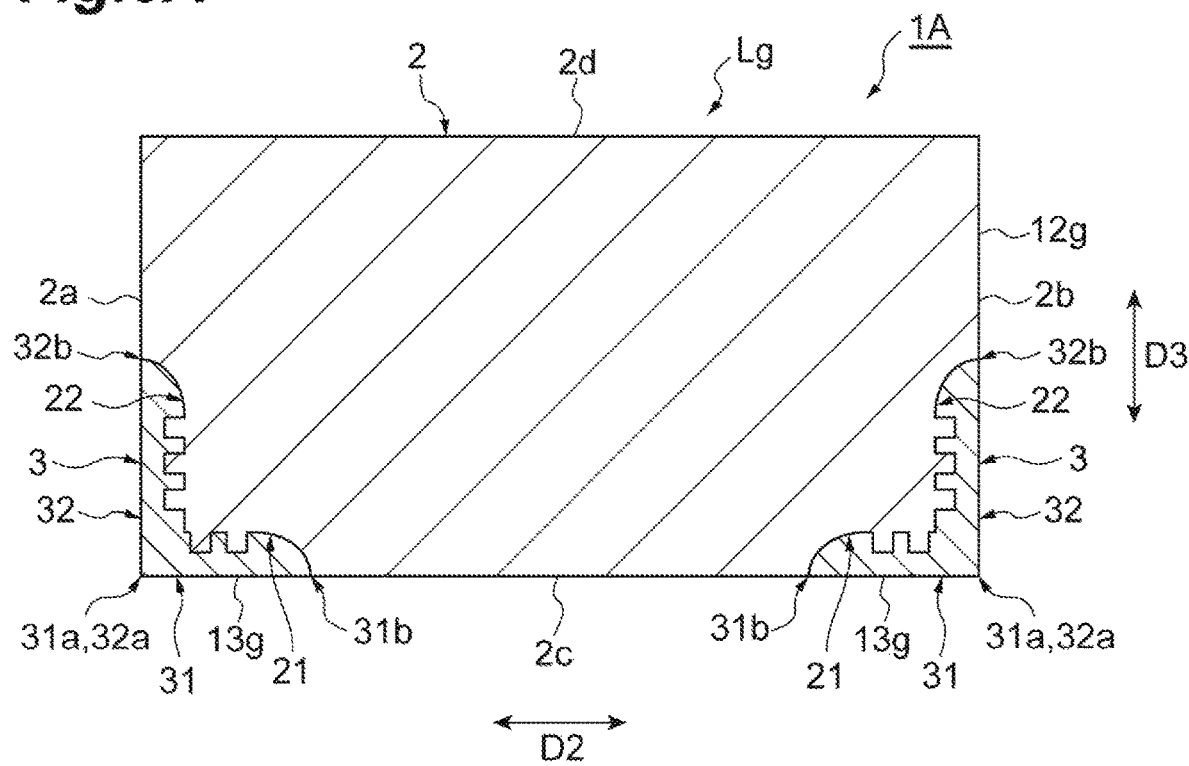
FIGS. 5A and 5B are cross-sectional views showing cross sections of a laminated coil component according to a first modified example orthogonal to the lamination direction.
Figure 5B:
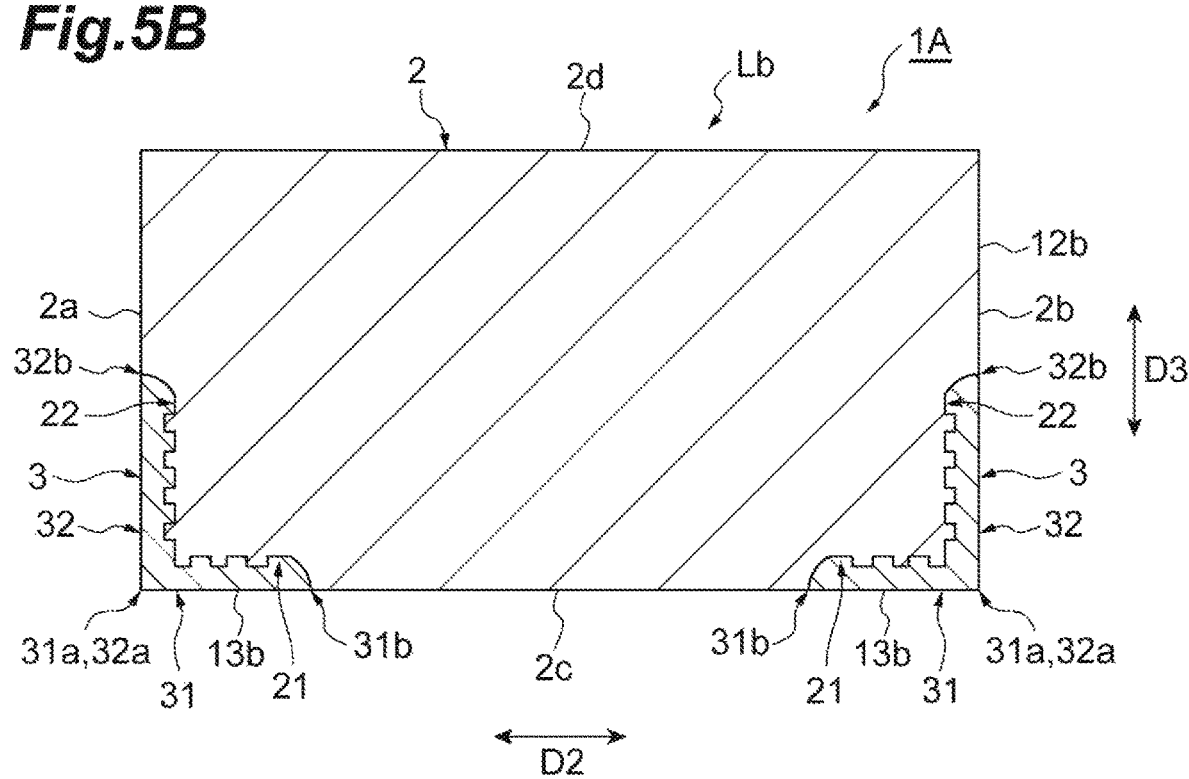
Figure 6:
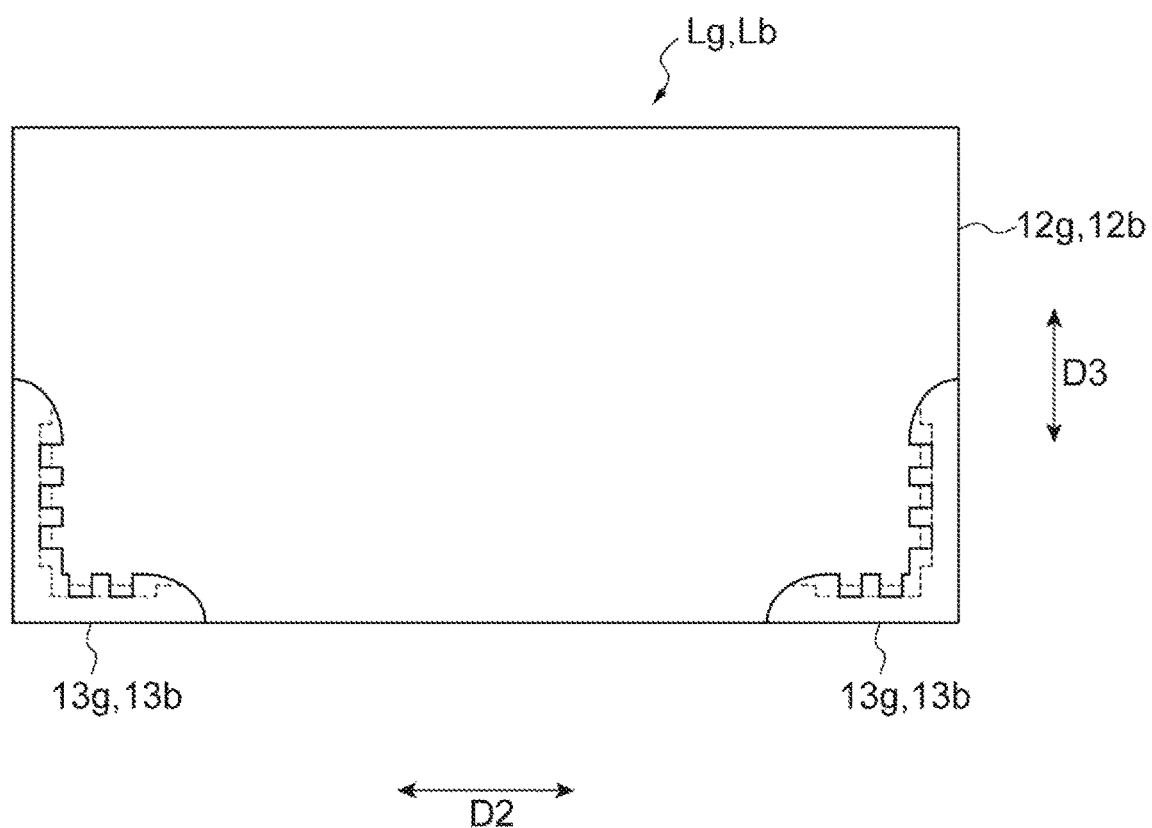
FIG. 6 is a view for explaining conductor layers of the laminated coil component in FIGS. 5A and 5B.

FIGS. 5A and 5B are cross-sectional views showing cross sections of a laminated coil component according to a first modified example orthogonal to the lamination direction. FIG. 5A shows a cross section of the layer Lg orthogonal to the direction D1. FIG. 5B shows a cross section of the layer Lb orthogonal to the direction D1. FIG. 6 is a view for explaining conductor layers of the laminated coil component in FIGS. 5A and 5B. A laminated coil component 1A according to the first modified example shown in FIGS. 5A, 5B, and 6 differs from the laminated coil component 1 according to the embodiment in the shapes of the element body 2 and the conductors 3.

As shown in FIGS. 5A, 5B and 6, in the laminated coil component 1A, the conductor layer 13b differs from the conductor layer 13g in the thickness of the conductor portions 31 and 32, and the projection height of the projections and the depression depth of the depressions in the uneven portion of the conductor portions 31 and 32. The thickness of the conductor portions 31 and 32 of the conductor layer 13b is less than the thickness of the conductor portions 31 and 32 of the conductor layer 13g. The projection height of the projections and the depression depth of the depressions of the uneven portions of the conductor portions 31 and 32 of the conductor layer 13b are less than the projection height of the projections and the depression depth of the uneven portions of the conductor portions 31 and 32 of the conductor layer 13g. The bottom positions of the depressions of the uneven portions of the conductor portions 31 and 32 of the conductor layer 13b correspond to the bottom positions of the depressions of the uneven portions of the conductor portions 31 and 32 of the conductor layer 13g. The bottom positions of the depressions of the uneven portions of the conductor portions 31 and 32 of the conductor layer 13b may not correspond to the bottom positions of the depressions of the uneven portions of the conductor portions 31 and 32 of the conductor layer 13g.

Although the illustration of the conductor layers 13c, 13d, 13e, and 13f is omitted, the conductor layers 13b, 13d, and 13f have the same shape and the conductor layers 13c, 13e, and 13g have the same shape also in the laminated coil component 1A. The element body 2 has an uneven portion engaged with such uneven portions of the conductors 3. For this reason, according to the laminated coil component 1A, it is possible to obtain a similar effect to that of the laminated coil component 1.

Figure 7:
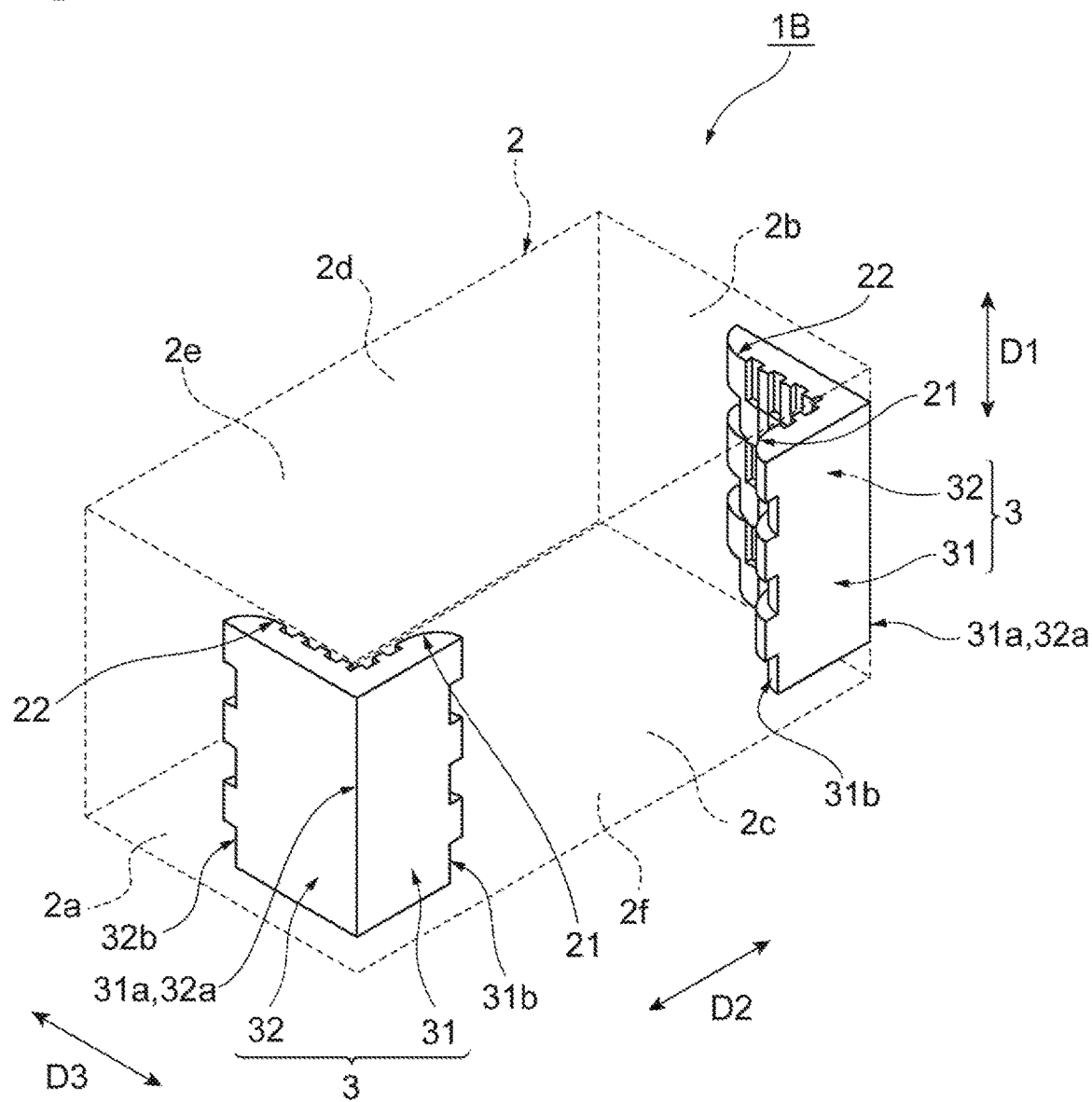
FIG. 7 is a perspective view of a laminated coil component according to a second modified example.

FIG. 7 is a perspective view of a laminated coil component according to a second modified example. In FIG. 7, the element body 2 is indicated by a broken line, and illustration other than conductors 3 is omitted. As shown in FIG. 7, a laminated coil component 1B according to the second modified example differs from the laminated coil component 1 according to the embodiment in the shapes of the element body 2 and the conductors 3. The length of the conductor portion 31 in the direction D2 and the length of the conductor portion 32 in the direction D3 vary according to location in the direction D1. When viewed from the direction D3, the end portion 31b of the conductor portion 31 has an uneven portion. When viewed from the direction D2, the end portion 32b of the conductor portion 32 has an uneven portion. The element body 2 has an uneven portion engaged with the uneven portions of the end portions 31b and 32b.

Figure 8A:
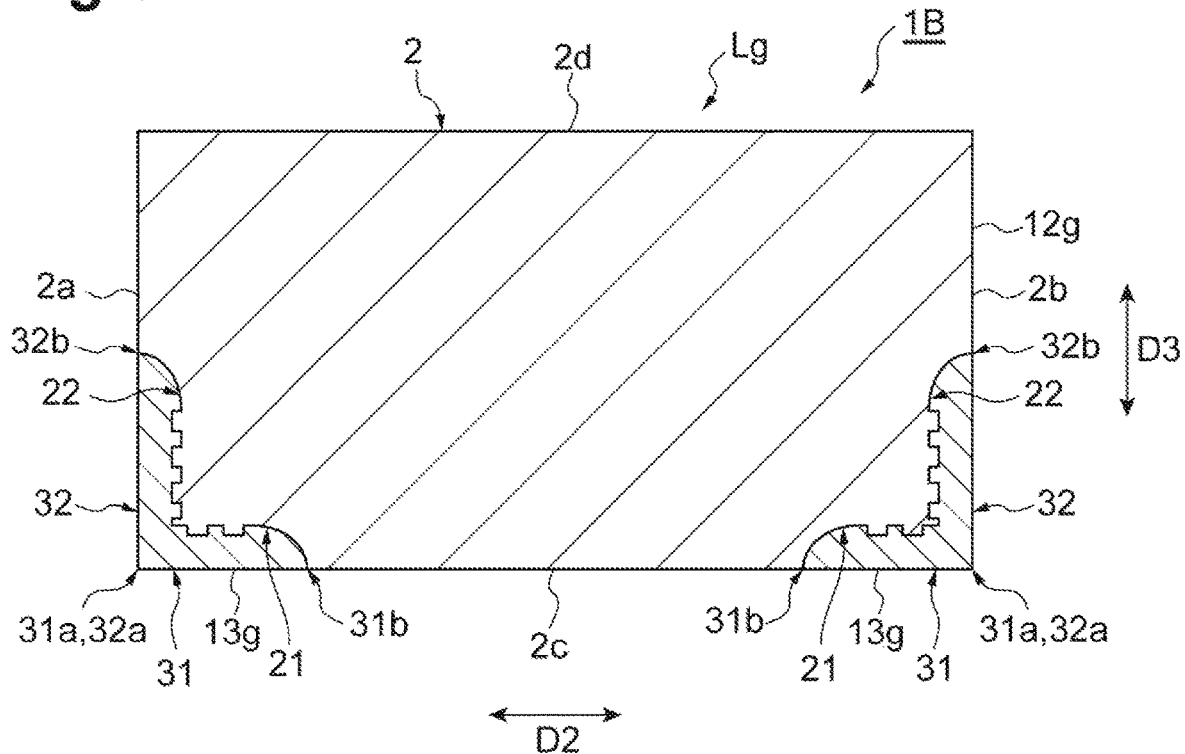
FIGS. 8A and 8B are cross-sectional views showing cross sections of the laminated coil component in FIG. 7 orthogonal to the lamination direction.
Figure 8B:
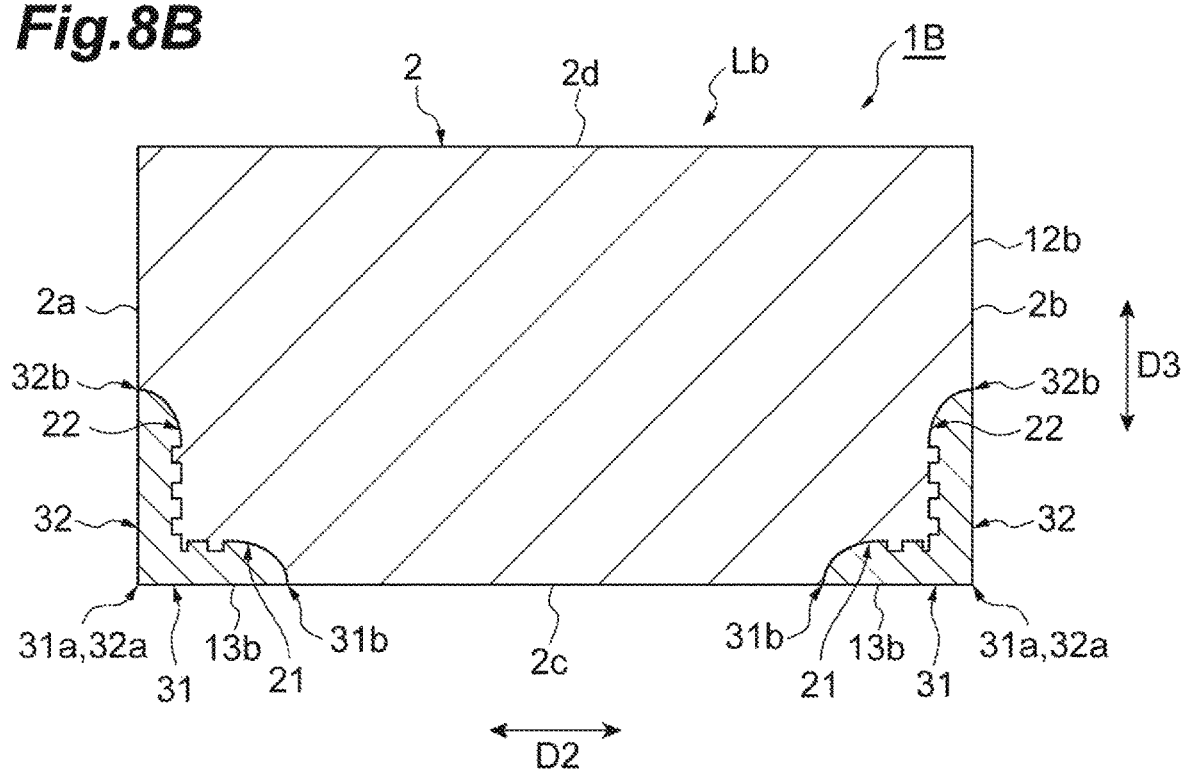
Figure 9:
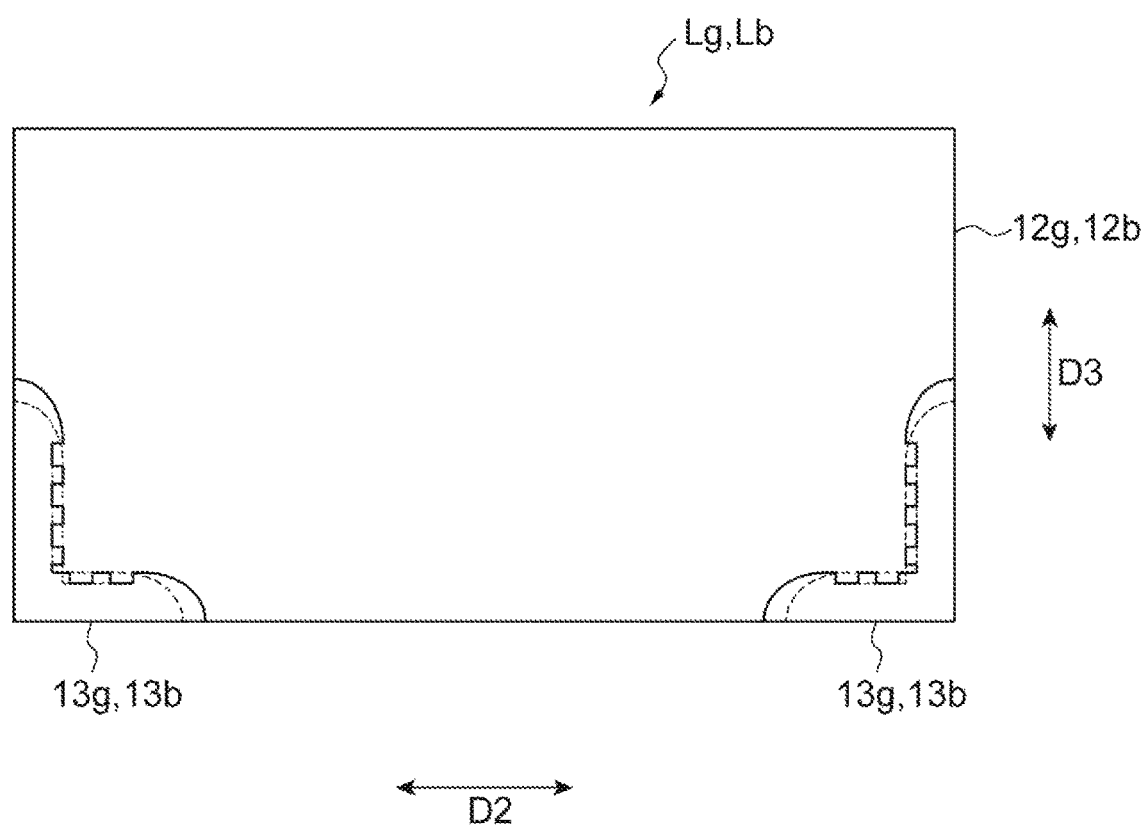
FIG. 9 is a view for explaining conductor layers of the laminated coil component in FIG. 7.

FIGS. 8A and 8B are cross-sectional views showing cross sections of the laminated coil component in FIG. 7 orthogonal to the lamination direction. FIG. 8A shows a cross section of the layer Lg orthogonal to the direction D1. FIG. 8B shows a cross section of the layer Lb orthogonal to the direction D1. FIG. 9 is a view for explaining conductor layers of the laminated coil component in FIG. 7. As shown in FIGS. 8A, 8B, and 9, in the laminated coil component 1B, the conductor layer 13b differs from the conductor layer 13g in the width (the length in the direction D2) of the conductor portion 31 and the width (the length in the direction D3) of the conductor portion 32. The width of the conductor portions 31 and 32 of the conductor layer 13b is less than the width of the conductor portions 31 and 32 of the conductor layer 13g.

Although the illustration of the conductor layers 13c, 13d, 13e, and 13f is omitted, the conductor layers 13b, 13d, and 13f have the same shape also in the laminated coil component 1B. The conductor layers 13c, 13e, and 13g have the same shape. For this reason, the end portions 31b and 32b of the conductor portions 31 and 32 exposed on the outer face of the element body 2 have the uneven portions as described above. The element body 2 has an uneven portion engaged with such uneven portions of the conductors 3. For this reason, according to the laminated coil component 1B, it is possible to obtain a similar effect to that of the laminated coil component 1. According to the laminated coil component 1B, it is possible to further suppress separation of the conductors 3 due to stress in the direction D1.

In the laminated coil components 1, 1A, and 1B, the total number of conductor layers having uneven portions at the cross section orthogonal to the direction D1 among the conductor layers 13b to 13g may be fewer than the total number of the conductor layers 13b to 13g. In this case, each conductor 3 can be formed by combining the conductor layer having the uneven portion at the cross section orthogonal to the direction D1 and the conductor layer having no uneven portion at the cross section orthogonal to the direction D1. For this reason, it is possible to form a step between the conductor layer having the uneven portion at the cross section orthogonal to the direction D1 and the conductor layer having no uneven portion at the cross section orthogonal to the direction D1. As a result, it is possible to improve the adhesion between the conductors 3 and the element body 2.

In the laminated coil components 1, 1A, and 1B, at least one of the conductor portions 31 and 32 is only required to have the uneven portion at the cross section orthogonal to the direction D1. For example, the conductor portion 32 alone may have the uneven portion at the cross section orthogonal to the direction D1. In this case, for example, the conductor portion 31 may have one projection, and the element body 2 may have one depression engaged with the one projection of the conductor portion 31. The conductor portion 31 may have one depression and the element body 2 may have one projection engaged with the one depression of the conductor portion 31.

In the laminated coil components 1, 1A, and 1B, each conductor 3 may be disposed not inside the depressions 21 and 22 but on the outer face of the element body 2. In the laminated coil components 1, 1A, and 1B, each conductor 3 may have either the conductor portion 31 or the conductor portion 32.

In the laminated coil components 1, 1A, and 1B, the uneven portions of the element body 2 and the conductors 3 are not limited to the rectangular wave shape, but may be, for example, a trapezoidal wave shape, a sinusoidal wave shape, or a sawtooth shape. That is, the projections of the uneven portion of the element body 2 and the projections of the uneven portions of the conductors 3 have, for example, a rectangular shape, a trapezoidal shape, an arc shape, or a triangular shape.

In the embodiment described above, the laminated coil components 1, 1A, and 1B have been described as examples of a laminated electronic component, but the present invention is not limited to these, and can be applied to other laminated electronic components such as laminated ceramic capacitors, laminated varistors, laminated piezoelectric actuators, laminated thermistors, and laminated composite components.

What is claimed is:

1. A laminated electronic component comprising:
    an element body formed by laminating a plurality of element-body layers in a first direction;
    a pair of conductors formed by laminating a plurality of conductor layers in the first direction, the conductor layers being in direct contact with each other, wherein
    the pair of conductors is provided on the element body in such a way as to be separated from each other in a second direction orthogonal to the first direction,
    the pair of conductors has an uneven portion and the element body has an uneven portion engaged with the uneven portion of the pair of conductors at a cross section orthogonal to the first direction,
    the pair of conductors has an uneven portion and the element body has an uneven portion engaged with the uneven portion of the pair of conductors at a cross section along the first direction,
    the number of conductor layers having uneven portions at the cross section orthogonal to the first direction among the plurality of conductor layers is equivalent to the total number of the plurality of conductor layers, and
    each uneven portion in each of the conductor layers includes protrusions having a height and depressions having a depth in a cross-section containing the conductor layers perpendicular to the first direction, and wherein the height and depth are different from one conductor layer to an adjacent conductor layer of the conductor layers, and the protrusions and depressions are offset from one conductor layer to an adjacent conductor layer of the conductor layers.

2. The laminated electronic component according to claim 1, wherein the pair of conductors has an L shape when viewed from the first direction and includes a first conductor portion extending in the second direction and a second conductor portion extending in a third direction orthogonal to the first direction and the second direction.

3. The laminated electronic component according to claim 2, wherein a length of the first conductor portion in the second direction and a length of the second conductor portion in the third direction vary according to location in the first direction.

4. The laminated electronic component according to claim 1, wherein each uneven portion in each of the element-body layers includes protrusions having a height and depressions having a depth in a cross-section containing the element-body layers perpendicular to the first direction, and wherein the height and depth are different from one element-body layer to an adjacent element-body layer of the element-body layers, and the protrusions and depressions are offset from one element-body layer to an adjacent element-body layer of the element-body layers.

5. The laminated electronic component according to claim 1, wherein each conductor layer includes a first conductor portion extending in the second direction and a second conductor portion extending in a third direction orthogonal to both the first direction and the second direction, and both the first conductor portion and the second conductor portion include the uneven portions at the cross section along the first direction.

* * * * *